(12) United States Patent
Stafstrom

(10) Patent No.: US 12,318,708 B2
(45) Date of Patent: Jun. 3, 2025

(54) FRACTION COLLECTION SYSTEM AND METHOD

(71) Applicant: Cytiva Sweden AB, Uppsala (SE)

(72) Inventor: Nils Stafstrom, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 358 days.

(21) Appl. No.: 17/280,425

(22) PCT Filed: Oct. 9, 2019

(86) PCT No.: PCT/EP2019/077419
§ 371 (c)(1),
(2) Date: Mar. 26, 2021

(87) PCT Pub. No.: WO2020/074613
PCT Pub. Date: Apr. 16, 2020

(65) Prior Publication Data
US 2022/0001300 A1    Jan. 6, 2022

(30) Foreign Application Priority Data
Oct. 11, 2018 (GB) ...................... 1816610

(51) Int. Cl.
*B01D 15/24* (2006.01)
*G01N 30/80* (2006.01)
*G01N 30/82* (2006.01)

(52) U.S. Cl.
CPC .......... *B01D 15/247* (2013.01); *G01N 30/80* (2013.01); *G01N 30/82* (2013.01)

(58) Field of Classification Search
CPC ....... B01D 15/247; G01N 30/80; G01N 30/82
See application file for complete search history.

(56) References Cited

U.S. PATENT DOCUMENTS

| 2,604,249 A | 7/1952 | Gorham |
| 2,672,581 A | 3/1954 | Gorham |
(Continued)

FOREIGN PATENT DOCUMENTS

| DE | 2248414 A1 | 4/1974 |
| GB | 744624 | 2/1956 |
(Continued)

OTHER PUBLICATIONS

PCT International Search Report and Written Opinion for PCT/EP2019/077419 mailed Dec. 10, 2019 (11 pages).
(Continued)

*Primary Examiner* — Benjamin L Lebron
(74) *Attorney, Agent, or Firm* — Eversheds-Sutherland (US) LLP

(57) ABSTRACT

A method for fraction collection and a fraction collection system (100) comprising: —a dispensing device (23) including an outlet (24) configured for dispensing fractions of a liquid received from a connected system; —plural receptacles (25) configured for receiving one or more of said fractions, wherein the receptacles (25) and the dispensing device (23) are movable in relation to each other into a number of different positions such that the dispensing device (23) is capable of dispensing a respective fraction of said liquid into one or more of the receptacles (25); —a waste collection device (27), which is arranged in the fraction collection system (100) such that it is movable into at least a first and a second position wherein, in said first position, an inlet (29) of the waste collection device (27) is positioned below the outlet (24) of the dispensing device (23) such that liquid being dispensed from the outlet (24) of the dispensing device (23) is received in the waste collection device (27) and wherein, in the second position, the inlet (29) of the waste collection device (27) is not positioned below the
(Continued)

outlet (24) of the dispensing device (23) such that fractions being dispensed from the dispensing device (23) can be received in one or more of the receptacles (25).

16 Claims, 3 Drawing Sheets

(56) References Cited

U.S. PATENT DOCUMENTS

| | | | | |
|---|---|---|---|---|
| 2002/0148639 A1* | 10/2002 | Smith | ............... | H05K 3/4084 |
| | | | | 361/795 |
| 2012/0079896 A1* | 4/2012 | Frojdh | ............... | G01N 35/1016 |
| | | | | 73/864.21 |
| 2013/0042673 A1* | 2/2013 | Saari-Nordhaus | ..... | G01N 30/82 |
| | | | | 73/61.55 |
| 2016/0288016 A1 | 10/2016 | Okoba et al. | | |
| 2019/0064128 A1* | 2/2019 | Dargy | ............... | G01N 30/80 |

FOREIGN PATENT DOCUMENTS

| | | |
|---|---|---|
| JP | 2001305120 A | 10/2001 |
| WO | 2006/000840 A1 | 1/2006 |

OTHER PUBLICATIONS

Great Britain Search Report for GB Application No. 1816610.8 mailed Apr. 16, 2019 (3 pages).
English Translation of the Office Action in JP Application No. 2021-517979 issued Sep. 1, 2023.
European Office Action for EP 19786326.9 mailed Jun. 15, 2023 (4 pages).

\* cited by examiner

FRACTION COLLECTION SYSTEM AND METHOD

CROSS REFERENCE TO RELATED APPLICATIONS

This application claims the priority benefit of PCT/EP2019/077419, filed on Oct. 9, 2019, which claims the benefit of Great Britain Application No. 1816610.8, filed on Oct. 11, 2018, the entire contents of which are incorporated by reference herein.

TECHNICAL FIELD OF THE INVENTION

The present invention relates to a fraction collection system, a method for fraction collection, a chromatography system and to a control system.

BACKGROUND

Fraction collectors are widely used in many applications, such as in the field of liquid chromatography. A fraction collector is used for dispensing fractions of a flow of a liquid to a number of receptacles. The receptacles are typically constituted as test tubes mounted in a rack or as recesses formed in a plate. Two main working principles can be distinguished for fraction collectors: the rotatable collector wherein the receptacles are fed towards a dispensing device by a rotating movement, and the X-Y collector wherein the receptacles are fed towards a dispensing device by linear movements in one or two directions. Of course, these principles are the same as those for fraction collectors wherein the dispensing device is moving while the receptacles are at rest.

Regardless of the type of receptacle or fraction collector working principle, there is always a distance between each separate receptacle. Therefore, when switching from one receptacle to the next, a spillage of the dispensed liquid is likely to occur, especially in a case were the liquid flow is essentially continuous. There are numerous reasons for why such spillage is not desired: it could contain valuable substances, it could be a potential health hazard and the working area becomes messy.

Methods for avoiding the spillage are known. For example, in U.S. Pat. No. 4,077,444 to Gilson et al. there is described a valve and a valve operator that are used to discontinue a liquid flow through a dispensing tube in order to prevent spillage from the tube as it moves between positions. However, in certain applications, such as high precision liquid chromatography, interruption of the liquid flow during a hold time is a disadvantage. The performance of the liquid chromatography system is negatively affected due to the occurrence of diffusion of the components in the liquid volume held in the tubing near the dispensing device during the hold time. A method and device for reducing loss of liquid during fraction collection comprising an expandable chamber which is suitable for liquid chromatography is described in EP1177434. Such a system with an expandable chamber is suitable for avoiding spillage but is not designed for a peak fraction mode where some of the liquid fed between peaks should be transferred to waste rather than collected in receptacles. Furthermore a problem with the expandable chamber is that it may need to be cleaned between uses and there may be problems with contamination. Furthermore the expandable chamber requires a complex control in order to be filled and emptied with correct speed.

It is also known to use a shunt valve to convey the liquid flow to waste during the receptacle change. In a peak fraction mode liquid flow between detected peaks can also be conveyed to waste through such a shunt valve. A problem in systems comprising such a valve is that delay times through the valve will be complicated to compensate for and there is risk that valuable material is lost or mixed. There will also be problems with the liquid volume held in the tubing near the dispensing device between peak collections when rests from the previous peak may remain in the tubing when starting to collect the next peak. There may also be problems with contamination in the valve. The difference in delay volume through the valve to waste and through valve and subsequent tubing to the fraction outlet, will be complicated to compensate for and there is risk that valuable material is lost and/or mixed.

SUMMARY

An object of the present invention is to provide an improved method and system for fraction collection where spillage can be avoided and/or waste can be redirected.

This is achieved by a fraction collection system, a liquid chromatography system, a control system and by a method according to the independent claims.

According to one aspect of the invention a fraction collection system is provided comprising:
  a dispensing device including an outlet configured for dispensing fractions of a liquid received from a connected system;
  plural receptacles configured for receiving one or more of said fractions, wherein the receptacles and the dispensing device are movable in relation to each other into a number of different positions such that the dispensing device is capable of dispensing a respective fraction of said liquid into one or more of the receptacles;
  a waste collection device, which is arranged in the fraction collection system such that it is movable into at least a first and a second position wherein, in said first position, an inlet of the waste collection device is positioned below the outlet of the dispensing device such that liquid being dispensed from the outlet of the dispensing device is received in the waste collection device and wherein, in the second position, the inlet of the waste collection device is not positioned below the outlet of the dispensing device such that fractions being dispensed from the dispensing device can be received in one or more of the receptacles.

According to another aspect of the invention a method for fraction collection in a fraction collection system is provided, wherein said method comprises the steps of:
  dispensing fractions of a liquid from a dispensing device of the fraction collection system into receptacles provided in the fraction collection system;
  moving the dispensing device and receptacles in relation to each other such that a respective fraction of said liquid can be dispensed into one or more of the receptacles;
  controlling a position of a waste collection device provided in the fraction collection system to be in at least a first and a second position such that, in said first position, an inlet of the waste collection device is positioned below an outlet of the dispensing device such that liquid being dispensed from the outlet of the dispensing device is received in the waste collection device and, in said second position, the inlet of the waste collection device is not positioned below the outlet of the dispensing device such that liquid being dispensed from the dispensing device can be received in one or more of the receptacles.

According to another aspect of the invention a chromatography system comprising a fraction collection system according to above is provided.

According to another aspect of the invention a control system configured for being connected to a positioning device in a fraction collection system as described above is provided, wherein said control system is arranged to control the positioning device to move the dispensing device and the receptacles in relation to each other, wherein said control system further is connected to a waste collection device positioning device which is connected to the waste collection device and arranged to move said waste collection device into at least the first and the second position.

Hereby a waste collection device can be positioned such that liquid dispensed out from the dispensing device is collected in the waste collection device instead of in the receptacles. The waste collection device can then be moved to a second position where liquid dispensed out from the dispensing device can be received in the receptacles. Hereby possible spillage can be avoided during switching between receptacles and furthermore any liquid which is not wanted in the receptacles can be collected in the waste collection device instead, such as for example liquid between peaks in a peak fraction mode or liquid remaining in the tubing to the dispensing device from a previous fractionation at start of a new fractionation. Hereby the use of a valve can be avoided and there will be no problem with different delay times/volumes in the system. Furthermore, with a system and method according to the invention there will be no problem with contamination between uses and no need for cleaning of the waste collection device. Furthermore, receptacles can be utilized optimally, i.e. receptacles are not needed to be used for waste liquid for example at start of fractionation or between peak fractions.

In one embodiment of the invention the waste collection device is connected to an arm comprising the dispensing device, whereby the arm is movable and the waste collection device will be moved together with the arm and the dispensing device into different positions in relation to the receptacles. Hereby the waste collection device will be kept close to the dispensing device all the time and the waste collection device is only needed to be moved a short distance for transition between the first and the second position.

In one embodiment of the invention the receptacles are movable into different positions such that the dispensing device can dispense liquid into different receptacles.

In one embodiment of the invention the waste collection device is positioned in the first position during a relative movement between the receptacles and the dispensing device. Hereby spillage during receptacle change is prevented.

In one embodiment of the invention the fraction collection system further comprises a control system which is connected to a positioning device which is connected to either an arm comprising the dispensing device or to a tray comprising the receptacles, wherein said control system is arranged to control the positioning device to move the dispensing device and the receptacles in relation to each other, wherein said control system further is connected to a detector which can detect a content in a liquid which is fed to the dispensing device for being dispensed into the receptacles and wherein said control system further is connected to a waste collection device positioning device which is connected to the waste collection device and arranged to move said waste collection device into at least the first and the second position.

In one embodiment of the invention said control system is arranged for controlling a relative movement of the dispensing device and the receptacles in dependence of an output from the detector and wherein said control system is arranged to control a movement of the waste collection device into the first or the second position in dependence of an output from the detector and/or in dependence of the relative movement of the dispensing device and the receptacles. Hereby liquid detected as waste by the detector can be collected in the waste collection device and receptacles can be used efficiently.

DETAILED DESCRIPTION OF EMBODIMENTS

Figure 1A:
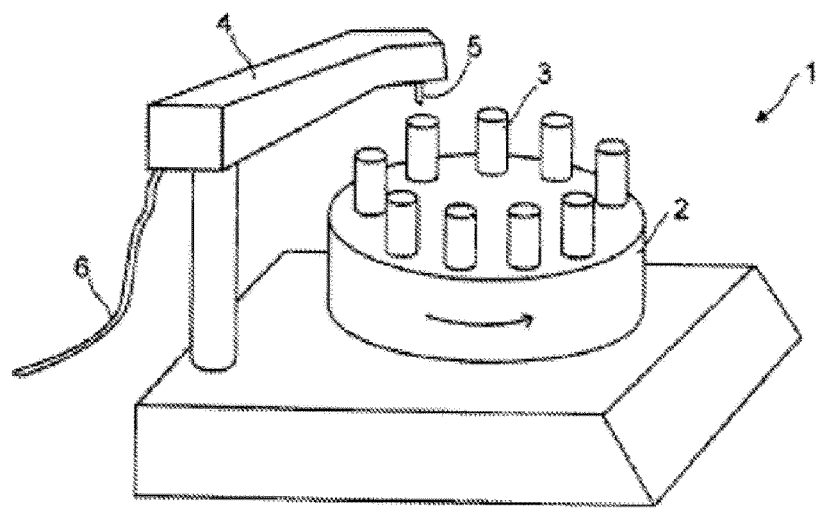
FIGS. 1a and 1b are schematic perspective views of two types of conventional fraction collectors.
Figure 1B:
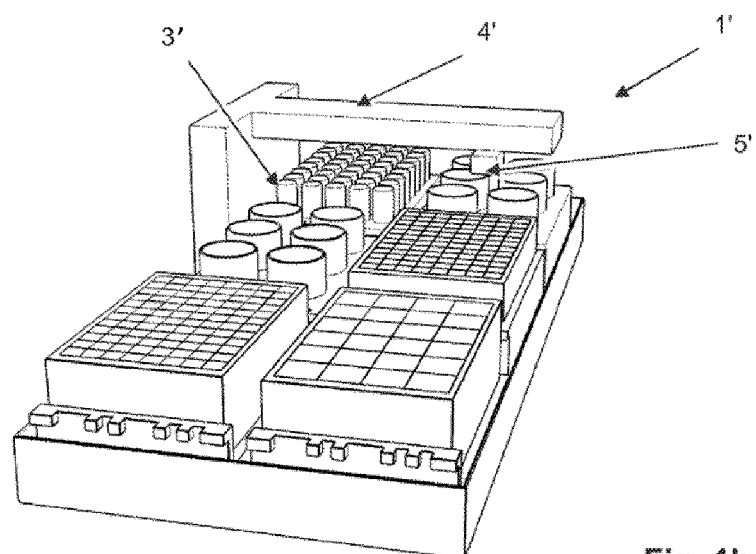

As a background, FIGS. 1a and 1b illustrates schematically the basic components of a typical fraction collector 1. FIG. 1a shows a collector 1 of rotational type, whereas FIG. 1b shows a collector 1' of X-Y translation type. The collector 1 includes a tray 2 that is rotatable around its center (illustrated with an arrow). The tray 2 is provided with a rack for storing receptacles, such as tubes 3. An extension arm 4 holds a dispensing device 5, typically a syringe needle or a plastic tube. The dispensing device is in fluid communication with a feed line, consisting of an inlet tubing 6, through which liquid to be dispensed to the tubes of the fraction collector is provided from any selected equipment (not shown), such as a liquid chromatography column.

During operation, the tray 2 is rotated to place a first tube 3 below the dispensing device 5. Liquid, fed through the tubing 6 via the dispensing device 5, is discharged into the tube. When the first tube 3 has received a fraction volume of liquid, the tray 2 is rotated an angle to place a second tube 3 below the dispensing device to receive a fraction volume. These steps are repeated a selected number of times.

It should be noted that this general description of components and operating steps of a conventional fraction collector with a rotatable tray is not intended to limit the present invention to this type of fraction collectors. It will be readily understood by anyone skilled in the art that the present invention is just as useful with any other type of conventional fraction collector. For example, a fraction collector 1' wherein the tubes 3' are placed below the dispensing device 5' using linear movements of the dispensing device like in FIG. 1b, or wherein other types of receptacles than test tubes, such as microtiter plates are used could be used with the invention, as is schematically illustrated by FIG. 1b.

Regardless of the type of fraction collector, there is a time interval T between the moment when the first receptacle leaves the liquid flow discharged from the dispensing device and the moment when the next receptacle is in place to receive the liquid flow. Assuming that the flow rate is FR(t), wherein t indicates that the flow rate could be varying with time, a volume V is lost during the receptacle switch, provided that no measures are taken. This volume may be calculated using the formula $$V = \int_0^T FR(t) \cdot dt \quad [1]$$

One conventional approach to avoid the spillage is to stop the flow through the dispensing device by way of a shut-off valve. Thereby no liquid is lost, but halting the flow affects the equipment upstream of the fraction collector, as well as the precision of the separation in its entirety.

Figure 2:
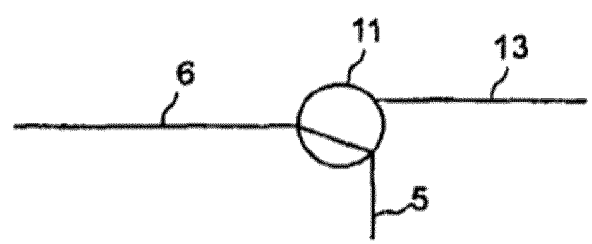
FIG. 2 is a schematic illustration of the flow paths of a conventional method for avoiding spillage during receptacle switching.

Another conventional approach, as described above and illustrated in FIG. 2, is to use a three-way valve 11 to convey the flow of liquid from the inlet tubing 6 to waste via a tubing 13 during the tube switch operation. Following the switching of tubes, the valve 11 directs the liquid into the tube via the dispensing device 5. This approach, while avoiding spillage on the fraction collector tray, will waste the volume V that could contain valuable components. Furthermore, as described above delay time/volume through the valve 11 may be complicated to compensate for and there may be problems with contamination in the valve and subsequent tubing.

Figure 3A:
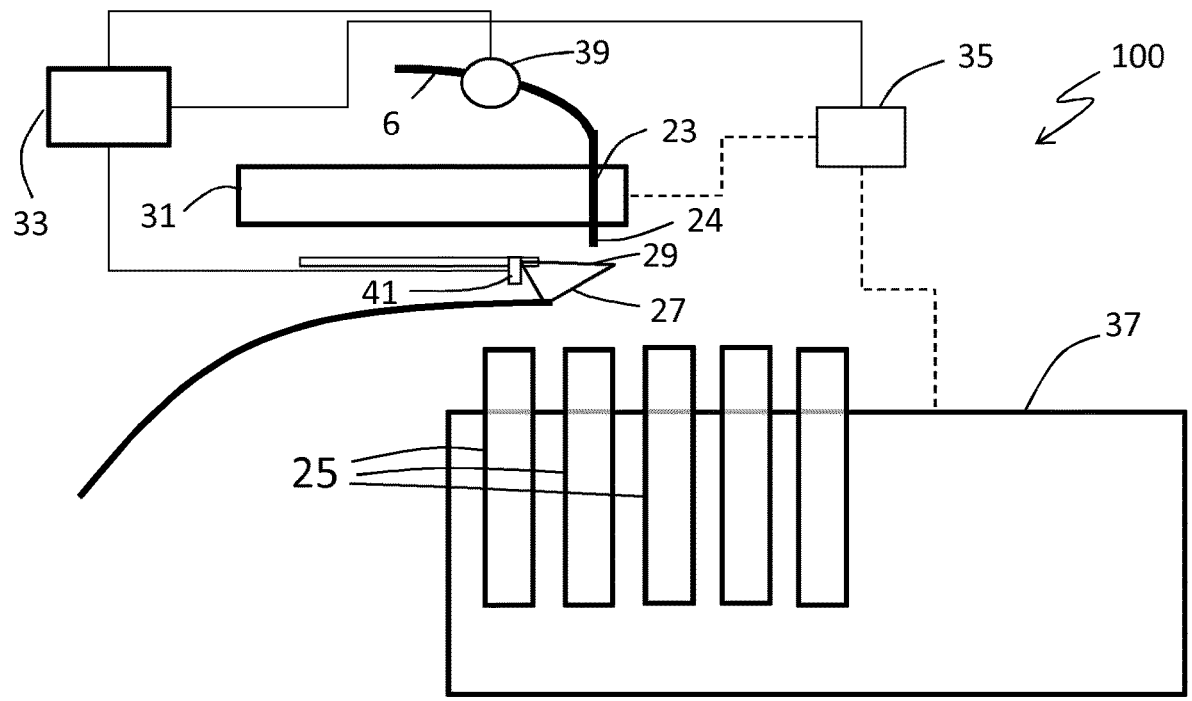
FIG. 3a shows schematically a fraction collection system according to one embodiment of the invention in a first position.
Figure 3B:
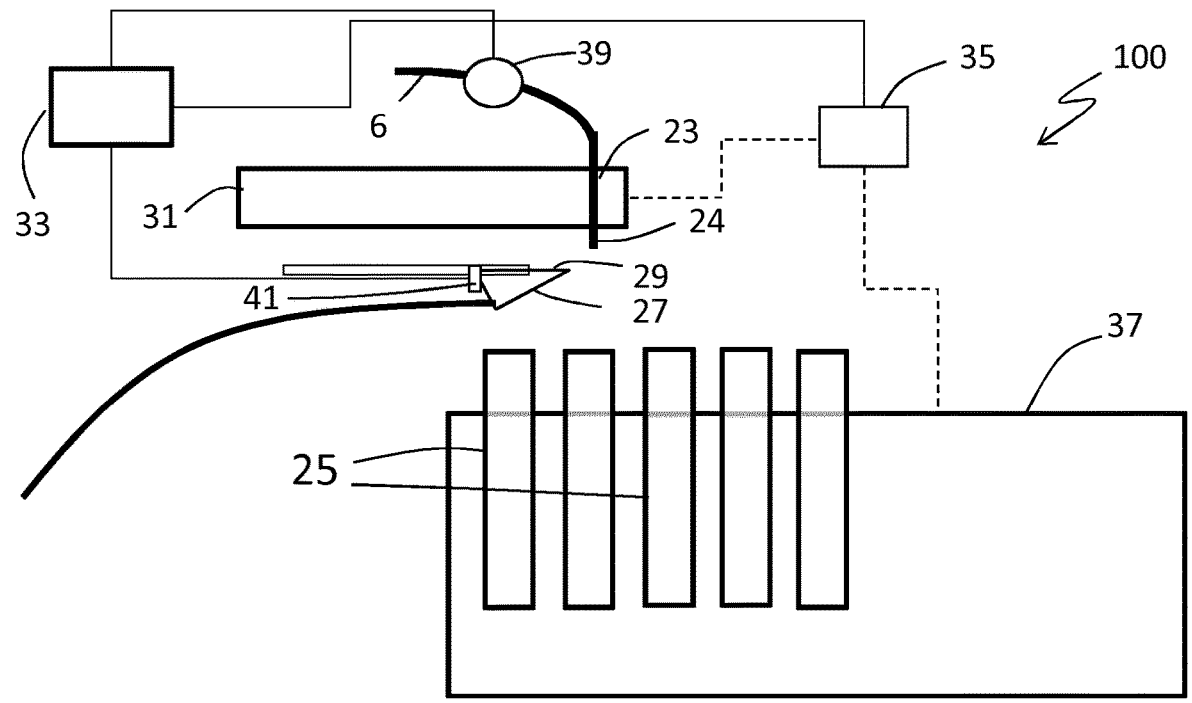
FIG. 3b shows schematically a fraction collection system according to one embodiment of the invention in a second position.

FIGS. 3a and 3b show schematically a fraction collection system 100 according to one embodiment of the invention in a first and second position respectively.

The fraction collection system 100 comprises a dispensing device 23 including an outlet 24 configured for dispensing fractions of a liquid received from a connected system. The dispensing device 23 is mounted to an arm 31 which may be movable to different positions. An inlet tubing 6 transferring liquid from a connected system, such as for example a liquid chromatography system, can be connected to the dispensing device 23. Plural receptacles 25 configured for receiving one or more of said fractions are provided in a tray 37. The tray may be a rotation tray, i.e. movable. Either the tray 37 is movable or the arm 31 is movable for allowing fraction collection in different receptacles as discussed above in relation to prior art. The receptacles 25 and the dispensing device 23 are hereby movable in relation to each other into a number of different positions such that the dispensing device 23 is capable of dispensing a respective fraction of said liquid into one or more of the receptacles 25.

According to the invention the fraction collection system 100 further comprises a waste collection device 27, which is arranged in the fraction collection system 100 such that it is movable into at least a first and a second position. The first position of the waste collection device 27 is shown in FIG. 3a and the second position of the waste collection device 27 is shown in FIG. 3b. In said first position an inlet 29 of the waste collection device 27 is positioned below the outlet 24 of the dispensing device 23 such that liquid being dispensed from the outlet 24 of the dispensing device 23 is received in the waste collection device 27. In the second position the inlet 29 of the waste collection device 27 is not positioned below the outlet 24 of the dispensing device 23 such that fractions being dispensed from the dispensing device 23 can be received in one or more of the receptacles 25.

The waste collection device 27 is in one embodiment of the invention connected to the arm 31 comprising the dispensing device 23. If the arm 31 is a movable arm which is moved in relation to the tray 37 for changing receptacles during fraction collection the waste collection device 27 will hereby be moved together with the arm 31 and the dispensing device 23 into different positions in relation to the receptacles 25. Hereby the waste collection device 27 will be kept close to the dispensing device 23 all the time and only a small movement of the waste collection device 27 is needed for moving it between the first and the second position. Hereby a quick transition between the two positions can be achieved and the waste collection device 27 can easily be moved into the first position for example during each receptacle change. In one embodiment of the invention the waste collection device is positioned in the first position during a relative movement between the receptacles and the dispensing device. Hereby any spillage is effectively prevented. Furthermore the waste collection device 27 can easily be moved to the first position when the liquid being dispensed is not a wanted fraction, for example sample between detected peeks (as detected by a detector which will be further described below) and hereby waste can easily be directed to waste collection instead of receptacles. This spillage prevention and waste collection is hereby performed completely without any valves involved and valve associated problems can be avoided, such as delay volume/time or contamination.

The fraction collection system 100 further comprises a control system 33. The control system 33 is connected to a positioning device 35 which in turn is connected to either the arm 31 comprising the dispensing device 23 or to the tray 37 comprising the receptacles 25 depending on which one of these is movable. The control system 33 is arranged to control the positioning device 35 to move the dispensing device 23 and the receptacles 25 in relation to each other. The control system 33 is further connected to a detector 39 which can detect a content in a liquid which is fed to the dispensing device 23 for being dispensed into the receptacles 25. The control system 33 is also connected to a waste collection device positioning device 41 which is connected to the waste collection device 27 and arranged to move said waste collection device 27 into at least the first and the second position. The waste collection device positioning device 41 can for example comprise a spring-loaded electromagnet which can be mounted on the arm 31 for moving the waste collection device 27 back and forth into the first and the second positions. The waste collection device positioning device 41 can of course comprise other types of devices for moving the waste collection device, such as for example a motor driven device or a pneumatic driven device. The idea is that the waste collection device can be moved quickly when needed.

The control system 33 may be arranged for controlling a relative movement of the dispensing device 23 and the receptacles 25 in dependence of an output from the detector 39 and the control system 33 may be arranged to control a movement of the waste collection device 27 into the first or the second position in dependence of an output from the detector 39 and/or in dependence of the relative movement of the dispensing device 23 and the receptacles 25. Hereby the control system 33 may control the waste collection device 27 to always be positioned in the first position during a relative movement of the dispensing device 23 and the receptacles 25. Hereby spillage is effectively prevented.

Furthermore the control system 33 can also control the waste collection device 27 in dependence of an output from the detector 39, i.e. if the output from the detector 39 indicates that waste will soon be dispensed by the dispensing device, i.e. liquid between peaks of interest, the waste collection device 27 can be controlled to be provided in the first position for collecting this waste until the output from the detector 39 indicates that a more interesting material, e.g. a peak in a peak fraction, will soon be dispensed by the dispensing device 23. The distance between the detector 39 and the dispensing device 23 will of course be relevant for the movement control of the waste collection device 27.

Figure 4:
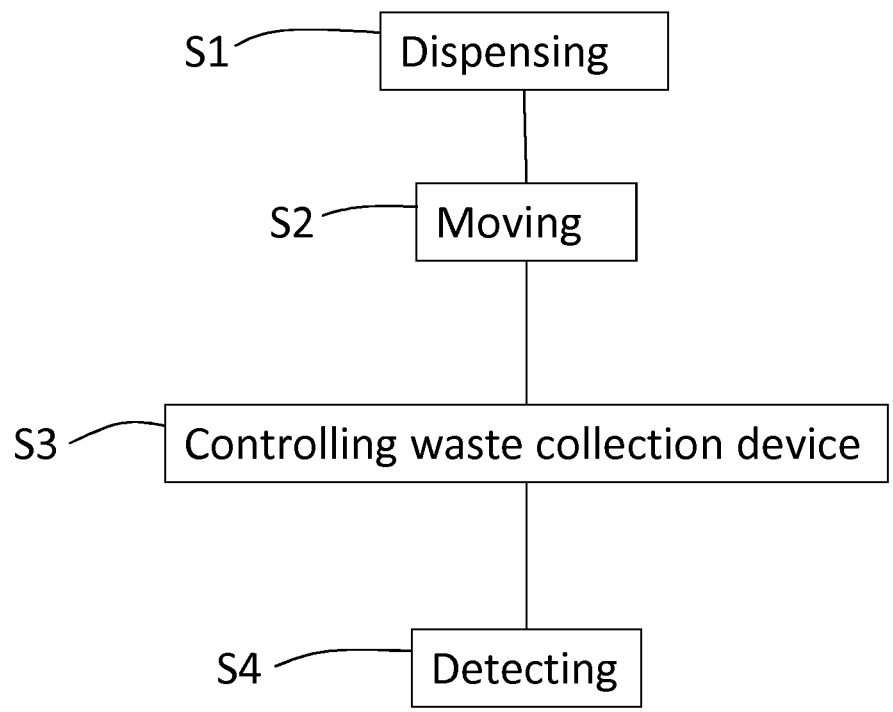
FIG. 4 is a flow chart of a method according to one embodiment of the invention.

FIG. 4 is a flow chart of a method according to one embodiment of the invention. The steps of the method are described in order below:

S1: Dispensing fractions of a liquid from a dispensing device 23 of the fraction collection system into receptacles 25 provided in the fraction collection system 100.

S2: Moving the dispensing device 23 and receptacles 25 in relation to each other such that a respective fraction of said liquid can be dispensed into one or more of the receptacles 25. The moving of the dispensing device 23 and the receptacles 25 in relation to each other comprises either moving the dispensing device 23 by controlling the position of an arm 33 to which both the dispensing device 23 and the waste collection device 27 are connected or moving the receptacles 25 by controlling the position of a tray 37 comprising the receptacles 25.

S3: Controlling a position of a waste collection device 27 provided in the fraction collection system 100 to be in at least a first and a second position such that, in said first position, an inlet 29 of the waste collection device 27 is positioned below an outlet 24 of the dispensing device 23 such that liquid being dispensed from the outlet 24 of the dispensing device 23 is received in the waste collection device 27 and, in said second position, the inlet 29 of the waste collection device 27 is not positioned below the outlet 24 of the dispensing device 23 such that liquid being dispensed from the dispensing device 23 can be received in one or more of the receptacles 25. The step of controlling the position of the waste collection device 27 may comprise positioning the waste collection device 27 in the first position during a relative movement between the receptacles 25 and the dispensing device 23.

The method may comprise an additional step:

S4: Detecting in a detector 39 a content in a liquid which is fed to the dispensing device 23 for being dispensed into the receptacles 25.

Hereby the method step S2 of moving the dispensing device 23 and receptacles 25 in relation to each other can be performed in dependence of an output from the detector 39 and said controlling of a position of the waste collection device 27 into the first or the second position can be performed in dependence of an output from the detector 39 and/or in dependence of the relative movement of the dispensing device 23 and the receptacles 25.

The invention claimed is:

1. A fraction collection system comprising:
a dispensing device including an outlet configured for dispensing fractions of a liquid received from a connected system;
plural receptacles configured for receiving one or more of said fractions, wherein the receptacles and the dispensing device are movable in relation to each other into a number of different positions such that the dispensing device is capable of dispensing a respective fraction of said liquid into one or more of the receptacles;
a waste collection device, which is connected to an arm comprising the dispensing device, the dispensing device mounted on the arm such that the dispensing device is not movable relative to the arm and is arranged in the fraction collection system such that it is movable into at least a first and a second position wherein, in said first position, an inlet of the waste collection device is positioned below the outlet of the dispensing device such that liquid being dispensed from the outlet of the dispensing device is received in the waste collection device instead of in the receptacles, and wherein, in the second position, the inlet of the waste collection device is not positioned below the outlet of the dispensing device such that fractions being dispensed from the dispensing device can be received in one or more of the receptacles; and
a control system connected to a waste collection device positioning device, wherein the waste collection device positioning device is connected to the waste collection device and arranged to move the waste collection device linearly along the length of the arm into the first and second positions;
wherein the fraction collection system is configured such that all liquid which is not wanted in the receptacles is also dispensed from the outlet.

2. The fraction collection system according to claim 1, wherein the arm is movable and the waste collection device will be moved together with the arm and the dispensing device into different positions in relation to the receptacles.

3. The fraction collection system according to claim 1, wherein the receptacles are movable into different positions such that the dispensing device can dispense liquid into different receptacles.

4. The fraction collection system according to claim 1, wherein the waste collection device is positioned in the first position during a relative movement between the receptacles and the dispensing device.

5. The fraction collection system according to claim 1, further comprising a control system which is connected to a positioning device which is connected to either the arm or to a tray comprising the receptacles, wherein said control system is arranged to control the positioning device to move the dispensing device and the receptacles in relation to each other, wherein said control system further is connected to a detector which can detect a content in a liquid which is fed to the dispensing device for being dispensed into the receptacles.

6. The fraction collection system according to claim 5, wherein said control system is arranged for controlling a relative movement of the dispensing device and the receptacles in dependence of an output from the detector and wherein said control system is arranged to control a movement of the waste collection device into the first or the second position in dependence of an output from the detector and/or in dependence of the relative movement of the dispensing device and the receptacles.

7. A method for fraction collection in a fraction collection system, wherein said method comprises the steps of:
dispensing fractions of a liquid from a dispensing device of the fraction collection system into receptacles provided in the fraction collection system;
moving the dispensing device and receptacles in relation to each other such that a respective fraction of said liquid can be dispensed into one or more of the receptacles;
controlling a position of a waste collection device provided in the fraction collection system and connected to an arm comprising the dispensing device to be in at least a first and a second position such that, in said first position, an inlet of the waste collection device is positioned below an outlet of the dispensing device such that liquid being dispensed from the outlet of the dispensing device is received in the waste collection device instead of in the receptacles, and wherein, in said second position, the inlet of the waste collection device is not positioned below the outlet of the dispensing device such that liquid being dispensed from the dispensing device can be received in one or more of the receptacles;

wherein the position of the waste collection device is controlled by a control system connected to a waste collection device positioning device, wherein the waste collection device positioning device is connected to the waste collection device and arranged to move the waste collection device linearly along the length of the arm into the first and second positions; and wherein the fraction collection system is configured such that all liquid which is not wanted in the receptacles is also dispensed from the outlet.

8. The method according to claim 7, wherein the step of moving the dispensing device and the receptacles in relation to each other comprises moving the dispensing device by controlling the position of the arm to which both the dispensing device and the waste collection device are connected.

9. The method according to claim 7, wherein the step of moving the dispensing device and the receptacles in relation to each other comprises controlling the position of the receptacles such that the dispensing device can dispense liquid into different receptacles.

10. The method according to claim 7, wherein the step of controlling the position of the waste collection device comprises positioning the waste collection device in the first position during a relative movement between the receptacles and the dispensing device.

11. The method according to claim 7, further comprising the step of detecting in a detector a content in a liquid which is fed to the dispensing device for being dispensed into the receptacles.

12. The method according to claim 11, wherein the step of moving the dispensing device and receptacles in relation to each other is performed in dependence of an output from the detector and wherein said controlling of a position of the waste collection device into the first or the second position is performed in dependence of an output from the detector and/or in dependence of the relative movement of the dispensing device and the receptacles.

13. A chromatography system comprising the fraction collection system according to claim 1.

14. A control system configured for being connected to a positioning device in the fraction collection system according to claim 1, wherein said control system is arranged to control the positioning device to move the dispensing device and the receptacles in relation to each other.

15. The control system according to claim 14, wherein said control system further is connected to a detector which can detect a content in a liquid which is fed to the dispensing device for being dispensed into the receptacles.

16. The control system according to claim 15, wherein said control system is arranged for controlling a relative movement of the dispensing device and the receptacles in dependence of an output from the detector and wherein said control system is arranged to control a movement of the waste collection device into the first or the second position in dependence of an output from the detector and/or in dependence of the relative movement of the dispensing device and the receptacles.

* * * * *